United States Patent
Sindelar et al.

(10) Patent No.: US 9,811,322 B1
(45) Date of Patent: Nov. 7, 2017

(54) SCALABLE PROVENANCE GENERATION FROM POINTS-TO INFORMATION

(71) Applicant: Oracle International Corporation, Redwood Shores, CA (US)

(72) Inventors: Stepan Sindelar, Praha (CZ); Padmanabhan Krishnan, Brisbane (AU); Bernhard Scholz, Sydney (AU); Raghavendra Kagalavadi Ramesh, Brisbane (AU); Yi Lu, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/169,710

(22) Filed: May 31, 2016

(51) Int. Cl.
G06F 9/44 (2006.01)
G06F 9/45 (2006.01)
G06F 17/30 (2006.01)
G06F 3/0484 (2013.01)

(52) U.S. Cl.
CPC ............ G06F 8/433 (2013.01); G06F 3/0484 (2013.01); G06F 17/30424 (2013.01); G06F 17/30958 (2013.01)

(58) Field of Classification Search
None
See application file for complete search history.

(56) References Cited

U.S. PATENT DOCUMENTS

| | | | | |
|---|---|---|---|---|
| 8,739,280 B2* | 5/2014 | Chess | ................... | G06F 21/554 713/166 |
| 9,171,028 B1* | 10/2015 | Collingbourne | .... | G06F 11/3636 |
| 2004/0015920 A1* | 1/2004 | Schmidt | .................. | G06F 9/443 717/153 |
| 2006/0230393 A1* | 10/2006 | Doh | .......................... | G06F 8/43 717/137 |
| 2008/0184208 A1* | 7/2008 | Sreedhar | ............... | G06F 21/577 717/128 |
| 2008/0301657 A1* | 12/2008 | Bowler | ................... | G06F 8/443 717/158 |
| 2014/0173571 A1* | 6/2014 | Gluck | ................. | G06F 11/3636 717/130 |

(Continued)

OTHER PUBLICATIONS

Lam et al., "ContextSensitive Program Analysis as Database Queries," Copyright 2005 ACM.*

(Continued)

*Primary Examiner* — Insun Kang
(74) *Attorney, Agent, or Firm* — Osha Liang LLP

(57) ABSTRACT

A method for analyzing a program may include obtaining the program and obtaining a points-to analysis that may include points-to tuples. The method may further include obtaining a result of a query based on the program. The method may further include extracting a data-flow trace specification that includes flow tuples. Each flow tuple may include a source variable defined in a first method and a sink variable defined in a second method. The method may further include adding, in a recursive manner until a termination condition is triggered, a trace edge to a data-flow trace graph for each points-to tuple of a list of points-to tuples. The respective points-to tuple and a first flow tuple may be used to form a first points-to tuple that is added to the list of points-to tuples. The list of points-to tuples may be initialized to the result of the query.

18 Claims, 7 Drawing Sheets

(56) References Cited

U.S. PATENT DOCUMENTS

| | | | | |
|---|---|---|---|---|
| 2014/0189875 A1* | 7/2014 | Beskrovny | ............ | G06F 21/577 726/25 |
| 2014/0245259 A1* | 8/2014 | Bolignano | .......... | G06F 11/3608 717/120 |
| 2015/0143349 A1* | 5/2015 | Wang | ....................... | G06F 8/434 717/156 |
| 2016/0110191 A1* | 4/2016 | Allen | ....................... | G06F 8/437 717/154 |

OTHER PUBLICATIONS

Gedik et al., "Elastic Scaling for Data Stream Processing," 2013 IEEE.*

Winter et al., "Path-Sensitive Data Flow Analysis Simplied," c Springer-Verlag Berlin Heidelberg 2013.*

Yu et al., "Level by Level: Making Flow- and Context-Sensitive Pointer Analysis Scalable for Millions of Lines of Code," Copyright 2010 ACM.*

Zhu, "Towards Scalable Flow and Context Sensitive Pointer Analysis," Copyright 2005 ACM.*

Chothia et al., "Explaining Outputs in Modern Data Analytics," Mar. 1, 2016.*

Gehani et al., "Fine-Grained Tracking of Grid Infections," Apr. 15, 2010.*

Gallingani et al., "Static Detection and Automatic Exploitation of Intent Message Vulnerabilities in Android Applications," ieee-security.org, May 22, 2015.*

Green et al., "Update Exchange With Mappings and Provenance," University of Pennsylvania Department of Computer and Information Science Technical Report, Nov. 2007.*

Demsky, ,Cross Application Data Provenance and Policy Enforcement, May 31, 2010.*

Stamatogiannakis et al.,"Looking Inside the Black-Box: Capturing Data Provenance Using Dynamic Instrumentation," Springer International Publishing Switzerland 2015.*

Urma et al., "Source-Code Queries with Graph Databases—with Application to Programming Language Usage and Evolution," 2013.*

Urma et al., "Expressive and Scalable Source Code Queries with Graph Databases," Copyrightc 2013 ACM.*

Hunt et al., "Improv: Flexible Data Provenance for Relational Databases,".*

Manevich, R. et al., "PSE: Explaining Program Failures via Postmortem Static Analysis", In Proceedings of the 12th ACM SIGSOFT Twelfth International Symposium on Foundations of Software Engineering (FSE), New York, NY, USA, Oct. 31-Nov. 6, 2004 pp. 63-72 (10 pages).

Mauborgne, L. et al., "Trace Partitioning in Abstract Interpretation Based Static Analyzers", In 14th European Symposium on Programming Languages and Systems (ESOP) Springer, Berlin, Apr. 2005; Lecture Notes in Computer Science (LNCS) vol. 3111, pp. 5-20 (16 pages).

Blackshear, S. et al., "Thresher: Precise Refutations for Heap Reachability", In ACM SIGPLAN Conference on Programming Language, PLDI, Jun. 16-19, 2013. Seatle, WA, USA pp. 275-286, (12 pages).

Deutch, D. et al., "Circuits for Datalog Provenance", In 17th International Conference on Database Theory (ICDT) Mar. 24-28, 2014, pp. 201-212 (12 pages).

Dey, S. et al., "On Imprementing Provenance-Aware Regular Path Queries with Relational Query Engines", In Proceedings of the Joint EDBT/ICDT Workshops, Mar. 18-22, 2013, Genoa, Italy; pp. 214-223 (10 pages).

* cited by examiner

Program 400

```
402 Public class Example {

404 Public static class Value { }

406 Public static class Holder { public Value v; }

408 Public static void entryPoint() {

410 Holder h = new Holder();

412 setup(h);

414 read(h); }

416 private static Value factory() { return new Value(); }

418 private static void setup( Holder k) { k.v = factory(); }

420 private static void read( Holder q) {

422 Value x = forward (q.v);

424 target (x); }

426 private static void target( Value v ) { .... }

428 private static Value forward( Value v) { return v; } }
```

FIG. 4

SCALABLE PROVENANCE GENERATION FROM POINTS-TO INFORMATION

BACKGROUND

Points-to analyses do not store the justification, or provenance for the presence of a tuple in the points-to result. However, in some contexts client-driven queries may require such justification, typically for specific points-to tuples (e.g., during debugging) that may satisfy a given property. For example, a code analysis may check whether a potentially tainted variable may be used at a given point in a program. The provenance for the relevant points-to tuples would identify the source of the potentially tainted variable and the sequence of assignments and method calls that may result in the potentially tainted object reaching the point in the program. However, it is not obvious how to combine provenance information for a client-driven analysis with bottom-up computation of results. During bottom-up processing, it is unclear which tuples will be relevant to the client query and therefore provenance information for all values may need to be tracked. And using a top-down algorithm is impractical because it requires substantial changes to the existing infrastructure. In addition, it is desirable for any provenance generating algorithm to be efficient, in order to scale to large codebases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing a program including obtaining the program and obtaining a points-to analysis for the program. The points-to analysis includes points-to tuples. Each points-to tuple includes a variable and an allocation site for an object. The method further includes obtaining a result of a query based on the program. The result includes a subset of the points-to tuples. The method further includes extracting, from the program, a data-flow trace specification that includes flow tuples. Each flow tuple includes a source variable defined in a first method and a sink variable defined in a second method. The sink variable may be assigned a value of the source variable during execution of the program. The method further includes adding, in a recursive manner until a termination condition is triggered, a trace edge to a data-flow trace graph for each points-to tuple of a list of points-to tuples. The respective points-to tuple corresponds to a first flow tuple. The respective points-to tuple and the first flow tuple are used to form a first points-to tuple that is added to the list of points-to tuples. The list of points-to tuples is initialized to the result of the query. The method further includes generating a report based on the data-flow trace graph.

In general, in one aspect, one or more embodiments relate to a system including a processor and a memory including instructions that, when executed by the processor, cause the processor to obtain the program and obtain a points-to analysis for the program. The points-to analysis includes points-to tuples. Each points-to tuple includes a variable and an allocation site for an object. The instructions further include obtaining a result of a query based on the program. The result includes a subset of the points-to tuples. The instructions further include extracting, from the program, a data-flow trace specification that includes flow tuples. Each flow tuple includes a source variable defined in a first method and a sink variable defined in a second method. The sink variable may be assigned a value of the source variable during execution of the program. The instructions further include adding, in a recursive manner until a termination condition is triggered, a trace edge to a data-flow trace graph for each points-to tuple of a list of points-to tuples. The respective points-to tuple corresponds to a first flow tuple. The respective points-to tuple and the first flow tuple are used to form a first points-to tuple that is added to the list of points-to tuples. The list of points-to tuples is initialized to the result of the query. The instructions further include generating a report based on the data-flow trace graph. The system further includes a repository, configured to store at least the program, the query and the points-to tuples.

In general, in one aspect, one or more embodiments of the invention relate to a non-transitory computer readable medium including instructions that, when executed by a processor, perform a method for analyzing a program including obtaining the program and obtaining a points-to analysis for the program. The points-to analysis includes points-to tuples. Each points-to tuple includes a variable and an allocation site for an object. The method further includes obtaining a result of a query based on the program. The result includes a subset of the points-to tuples. The method further includes extracting, from the program, a data-flow trace specification that includes flow tuples. Each flow tuple includes a source variable defined in a first method and a sink variable defined in a second method. The sink variable may be assigned a value of the source variable during execution of the program. The method further includes adding, in a recursive manner until a termination condition is triggered, a trace edge to a data-flow trace graph for each points-to tuple of a list of points-to tuples. The respective points-to tuple corresponds to a first flow tuple. The respective points-to tuple and the first flow tuple are used to form a first points-to tuple that is added to the list of points-to tuples. The list of points-to tuples is initialized to the result of the query. The method further includes generating a report based on the data-flow trace graph.

Other aspects of the invention will be apparent from the following description and the appended claims.

BRIEF DESCRIPTION OF DRAWINGS

FIG. 4 and FIG. 5 show examples in accordance with one or more embodiments of the invention.

DETAILED DESCRIPTION

Figure 1A:
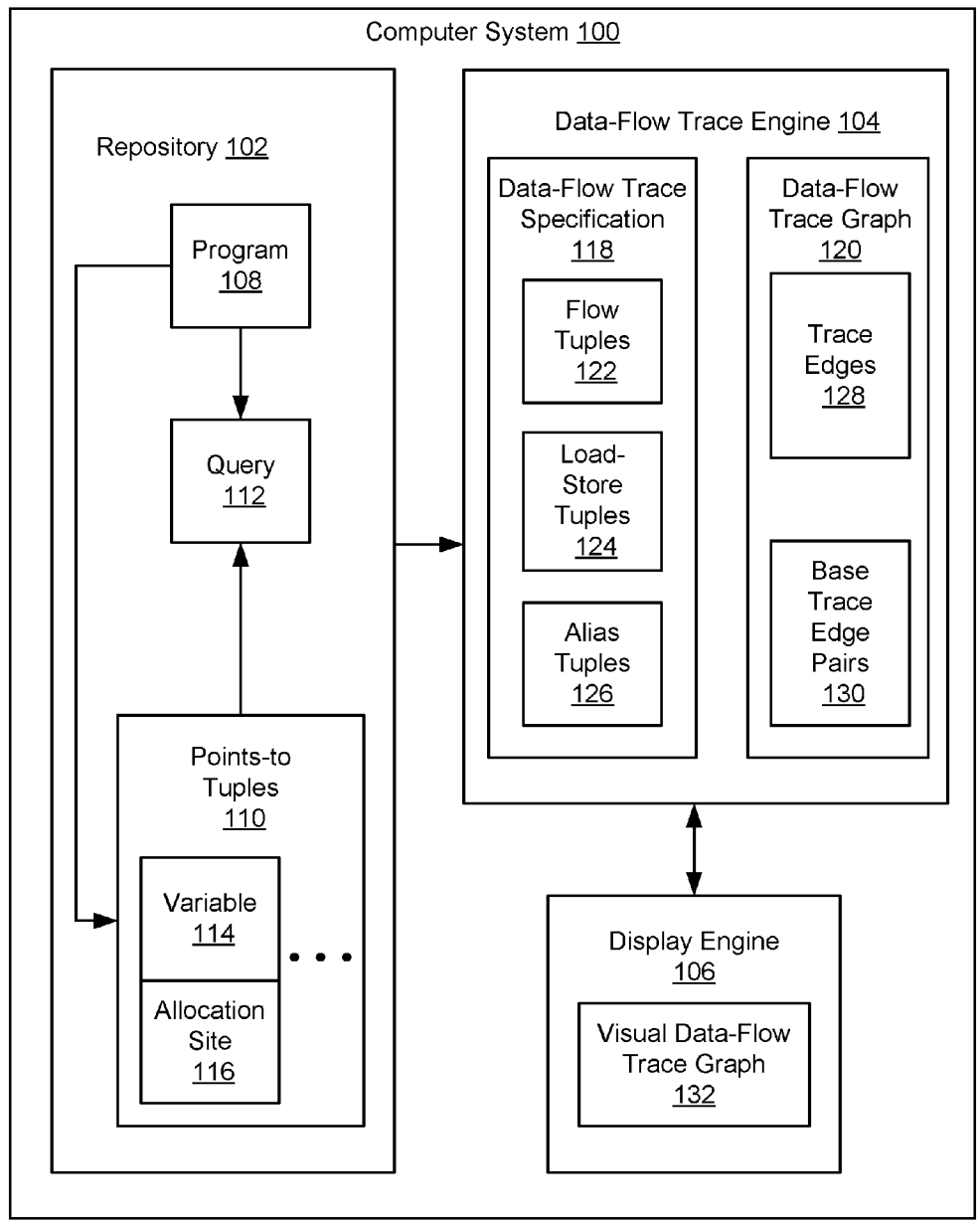
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system and non-transitory computer readable medium for analyzing a program. In particular, one or more embodiments are directed to a method that generates a data-flow trace graph based on a data-flow trace specification. The data-flow trace specification represents relationships regarding how values flow between and/or are aliased by variables in the program based on a flow-insensitive (i.e., static) points-to analysis of the program. The data-flow trace graph represents the provenance (i.e., flow of values) for those tuples in the points-to analysis that satisfy a query based on the program. The data-flow trace graph may be useful in identifying the causes of defects indicated by the points-to analysis. The data-flow trace graph links two different types of flows: a flow of values into a base object and a flow of values into a field of a base object. The efficiency and therefore the scalability of the analysis may be increased by restricting the analysis to variable flows that cross method boundaries (e.g., one variable may be a formal parameter of a first method and the other variable may be an actual parameter of a second method that calls the first method). The efficiency of the analysis may also be increased by restricting the analysis to methods that modify the heap (i.e., non-value-added "parameter forwarding" methods that simply return input parameters unchanged are excluded from the data-flow trace graph). Context information may be used to increase the precision of the analysis by reducing the number of redundant edges added to the data-flow trace graph. A graphical user interface (GUI) may be used to navigate the data-flow trace graph.

FIG. 1A shows a system in accordance with one or more embodiments of the invention. As shown in FIG. 1A, the system includes a computer system (100) that includes a repository (102), a data-flow trace engine (104), and a display engine (106). In one or more embodiments, the computer system (100) may be the computing system (600) described with respect to FIG. 6A and the accompanying description below, or may be the client device (626) described with respect to FIG. 6B.

Returning to FIG. 1A, in one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. In one or more embodiments of the invention, the repository (102) is a repository for storing data for use by and/or that is generated by the data-flow trace engine (104).

In one or more embodiments, the repository (102) includes a program (108), points-to tuples (110), and a query (112). In one or more embodiments of the invention, the program (108) may be a collection of source code that may include various software components. That is, the program (108) may be a collection of computer instructions written in a human-readable programming language. The program (108) may be transformed by a compiler program into binary machine code. Compiled machine code may then be executed by a processor in order to execute the software components generated from the program (108). In one or more embodiments, the program (108) may be represented in a procedural or imperative programming language (e.g., Java® (a registered trademark of Oracle America, Inc.)). In one or more embodiments, the program (108) may be represented in a declarative programming language. For example, a declarative program may be expressed in Datalog as a set of relations (i.e., facts) and rules (i.e., clauses). A relation may express facts as one or more tuples. A declarative program may express what a program should accomplish without expressing a sequence of instructions (i.e., a control flow) to accomplish the goal. Said another way, a declarative program (e.g., as opposed to procedural or imperative programming) may be a program in which the logic of a computation is expressed without describing its control flow. A declarative program language may seek to minimize side effects by describing what a program should accomplish rather than how to accomplish the program goal.

In one or more embodiments, the points-to tuples (110) may be generated by a flow-insensitive (i.e., static) points-to analysis of the program (108). In one or more embodiments of the invention, each points-to tuple (110) includes a variable (114) and an allocation site (116) for an object, such that the variable (114) may point to the allocation site (116) during the execution of the program (108). A points-to tuple (110) in which a variable 'var' may point to an object 'obj' at an allocation site (116) may be written as VarPointsToObj (var, obj).

A variable (114) may be a symbol (e.g., 'x', 'y', 'input', 'result') that references a location in the program (108) where a value is stored, such as an allocation site (116). An allocation site (116) may be a statement in the program (108) that declares, instantiates, and/or initializes an object. For example, an allocation site (116) A::x=new T( ) assigns a new object instance of type T to the variable (114) x, where the allocation site (116) is labeled 'A'. In one or more embodiments, the allocation site (116) (e.g., for a base object) may be referred to by the label associated with a 'new' statement. A variable (114) may refer to a simple allocation site (116) (e.g., a numerical or string value), a complex allocation site (116) (e.g., a base object or structure containing one or more fields), or a field within a complex allocation site (116). The allocation site (116) may contain different values at different points in time.

In one or more embodiments of the invention, a query (112) is a condition (e.g., a predicate) relative to the program (108) that may be satisfied by a subset of the points-to tuples (110) on which to focus trace (i.e., provenance) generation according to the interests of the user. A points-to query (112) may include one or more query variables that directly relate to the program conditions to be evaluated. For example, a points-to query (112) might include whether (e.g., in the context of a security analysis) a particular method in the program (108) may be invoked with a potentially 'tainted' (i.e., unsafe) value.

Continuing with FIG. 1A, in one or more embodiments, the system (100) includes the data-flow trace engine (104). The data-flow trace engine (104) may be implemented in hardware (i.e., circuitry), software, or any combination thereof. The data-flow trace engine (104) may include functionality to extract a data-flow trace specification (118) from the program (108) and may include functionality to generate a data-flow trace graph (120). In one or more embodiments of the invention, the data-flow trace specification (118) may be expressed as declarative logic programming language facts (i.e., as relations composed of tuples). The data-flow trace specification (118) may include flow tuples (122), load-store tuples (124) and alias tuples (126).

Figure 1B:
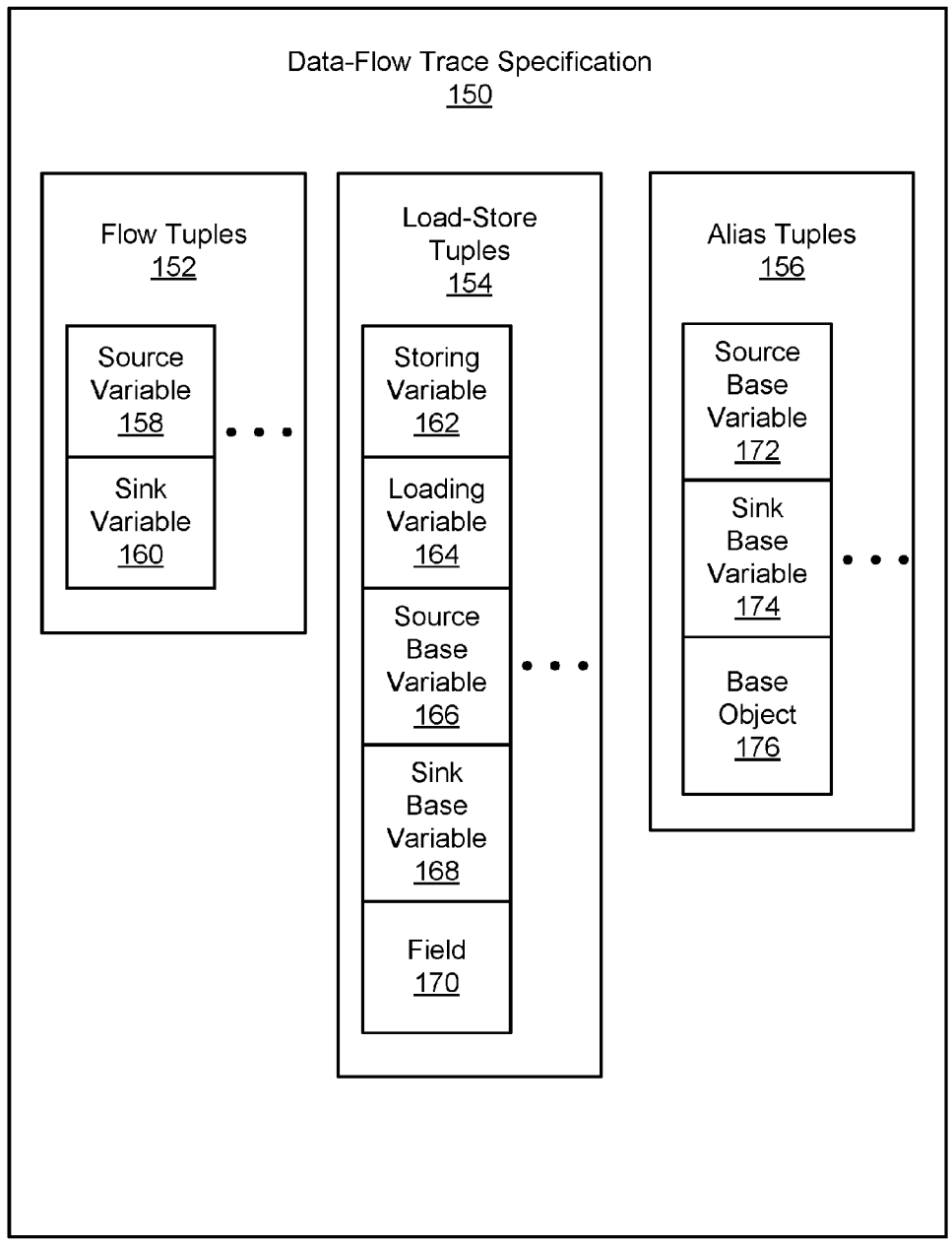

FIG. 1B illustrates the structure of the elements of the data-flow trace specification (150). That is, FIG. 1B illustrates the structure of the flow tuples (152), load-store tuples (154) and alias tuples (156). In one or more embodiments, each flow tuple (152) corresponds to a potential assignment (i.e., during the execution of the program (108)) of the value of a source variable (158) to a sink variable (160). In other words, the value of the source variable (158) may 'flow' to the sink variable (160). A flow tuple (152) may be written as Flow(source, sink).

The terms source variable (158) and sink variable (160) indicate the role of a given variable within a flow tuple (152). That is, a given variable may be a sink variable (160) in a first flow tuple (152) (i.e., the variable may be assigned a value from a source variable (158) in the first flow tuple (152)) and also may be a source variable (158) in a second flow tuple (152) (i.e., a value flows from the variable to a sink variable (160) in the second flow tuple (152)).

In one or more embodiments, the flow between the source variable (158) and a sink variable (160) may be an interprocedural flow. That is, local variable flows due to assignments within a method may be excluded from the analysis (e.g., because many local flows within a method may be short and localized within the code and may therefore be straightforwardly reconstructed, if necessary). In other words, the source variable (158) may be defined in a first method M of the program (108) and the sink variable (160) may be defined in a second method M' of the program (108). For example, the source variable (158) may be passed as an actual parameter from method M which calls method M', where the sink variable (160) may be a formal parameter of method M'. Alternatively, the value of the source variable (158) may be returned from method M' to the calling method M, where the sink variable (160) in method M may be assigned the value returned by method M'.

In one or more embodiments, both the calling method (e.g., method M above) and the called method (e.g., method M' above) may modify the heap (e.g., by allocating an object, modifying a field of an object, etc.). That is, a parameter-forwarding method, that simply returns its input parameter(s), without changing the state of an object in heap memory, may be excluded from the analysis (this does not reduce the precision of the analysis because parameter-forwarding methods do not add value to the data-flow trace).

Continuing with FIG. 1B, in one or more embodiments, each load-store tuple (154) may include a storing variable (162), a loading variable (164), a source base variable (166), a sink base variable (168), and a field (170). Load-store tuples (154) may represent the flow of a value that may be stored to and loaded from a field (170) of a base object that is referred to (i.e., aliased) by two base variables: a source base variable (166) (i.e., used to store the value) and a sink base variable (168) (i.e., used to load the value). Each load-store tuple (154) may correspond to a store statement and a load statement. A load-store tuple (154) may be written as LoadStore(StoringVar, LoadingVar, SourceBaseVar, SinkBaseVar, field). For example, in the store statement below, the value of a storing variable (162) (e.g., variable x) is assigned to a field (170) (e.g., field f) of the base object referenced by a source base variable (166) (e.g., variable $base_{source}$). And in the load statement below, a loading variable (164) (e.g., variable y) is assigned the value of a field (170) (e.g., field f) of the base object referenced by a sink base variable (168) (e.g., variable $base_{sink}$).

$base_{source}$.f=x(store statement)

y=$base_{sink}$.f(load statement)

In one or more embodiments, the field (170) may be an instance field of a base object. In one or more embodiments, the field (170) may be a static or class field of a base object. When the field (170) is a static field, the source base variable (166) and the sink base variable (168) may be irrelevant, and placeholder values may be used instead in the load-store tuple (154). In one or more embodiments, the storing variable (162) and/or the loading variable (164) may not be present. For example, a value may be stored directly into a field without using a storing variable (162), and a value may be loaded directly from a field (e.g., into a complex expression) without using a loading variable (164).

In one or more embodiments, the storing variable (162) and/or the loading variable (164) may be a field (170) of another base object. That is, instead of using variables x and y to store to or load from a field (170) of a base object, a field (170) of another base object may be used instead. For example, the store and load statements above could have been written as:

$base_{source}$.f=$base_{other}$.g(store statement)

$base_{other}$.h=$base_{sink}$.f(load statement)

In one or more embodiments, the alias relationship between the source base variable (166) and the sink base variable (168) may be represented using an alias tuple (156). Each alias tuple (156) may include a source base variable (172), a sink base variable (174), and a base object (176). An alias tuple (156) may be written as Alias(SourceVar, SinkVar, BaseObj). For example, a base object (176) assigned to the source base variable (172) may be aliased by the sink base variable (174) via an assignment of the source base variable (172) to the sink base variable (174). The assignment may occur via an interprocedural assignment, as described above.

Continuing with FIG. 1A, in one or more embodiments, the data-flow trace graph (120) may include trace edges (128) and base trace edge pairs (130). The data-flow trace graph (120) may express provenance for a points-to tuple (110) in terms of a chain of variables (114) through which an allocation site (116) flows to a variable (114) starting from the local variable (114) that is directly assigned the allocation site (116). There may be several such chains for each points-to tuple (110), where these chains form a graph.

The trace edges (128) and base trace edge pairs (130) play different roles in the data-flow trace graph (120). In one or more embodiments, the trace edges (128) trace a flow of values from an allocation site (116) to a succession of variables (114) via interprocedural assignments, where the values may either flow into a base object, or may flow into a field of a base object. The trace edges therefore may mirror the flow of a call graph. In one or more embodiments, these two parallel flows (i.e., the flow into a base object and the flow into a field of the base object) may be linked via base trace edge pairs (130), which indicate how aliasing has occurred. One edge in the base trace edge pair (130) may correspond to a store operation and another edge may correspond to a load operation. For example, a base trace edge may link a variable that stores to or loads from a field within a base object referenced by a base variable, as illustrated by the base trace edges (530, 532) in FIG. 5. This linkage may be useful because the load and store operations may occur at different locations in the program (108) relative to the interprocedural assignments (i.e., flows) that occur at method invocations.

A trace edge (128) may be written as TraceEdge(SourceVar, SinkVar, AllocSite) indicating that the value at an allocation site (116) flows from a source variable into a sink variable. A base trace edge pair (130) may be written as BaseTraceEdgePair(StoringVar, LoadingVar, SourceBaseVar, SinkBaseVar, BaseObject) indicating that a storing variable may be used to store a value into a base object referenced by a source base variable, and that the value may be loaded into a loading variable from the base object referenced via a sink base variable.

Continuing with FIG. 1A, in one or more embodiments, the data-flow trace engine (104) may also include functionality to generate a report from the data-flow trace graph (120). For example, the report may include, for each variable (114) and/or each allocation site (116) in the data-flow trace graph (120), a listing of the trace edges (128) and base trace edge pairs (130) corresponding to the variable. Alternatively, the report may be restricted to certain variables (114) or allocation sites (116) of interest (e.g., a variable (114) or allocation site (116) referred to by the query (112)). In one or more embodiments, the report may be stored as a document capable of being accessed by an interested entity.

In one or more embodiments, the computer system (100) may include a display engine (106). The display engine (106) may be implemented in hardware (i.e., circuitry), software, or any combination thereof. The display engine (106) may include functionality to generate a visual data-flow trace graph (132) from the data-flow trace graph (120). The display engine (106) may include a graphical user interface (GUI). The GUI may include functionality to enable the user to display and navigate the visual data-flow trace graph (132) via various display options.

While FIG. 1A shows a configuration of components, other configurations may be used without departing from the scope of the invention. For example, various components may be combined to create a single component. As another example, the functionality performed by a single component may be performed by two or more components.

Figure 2:
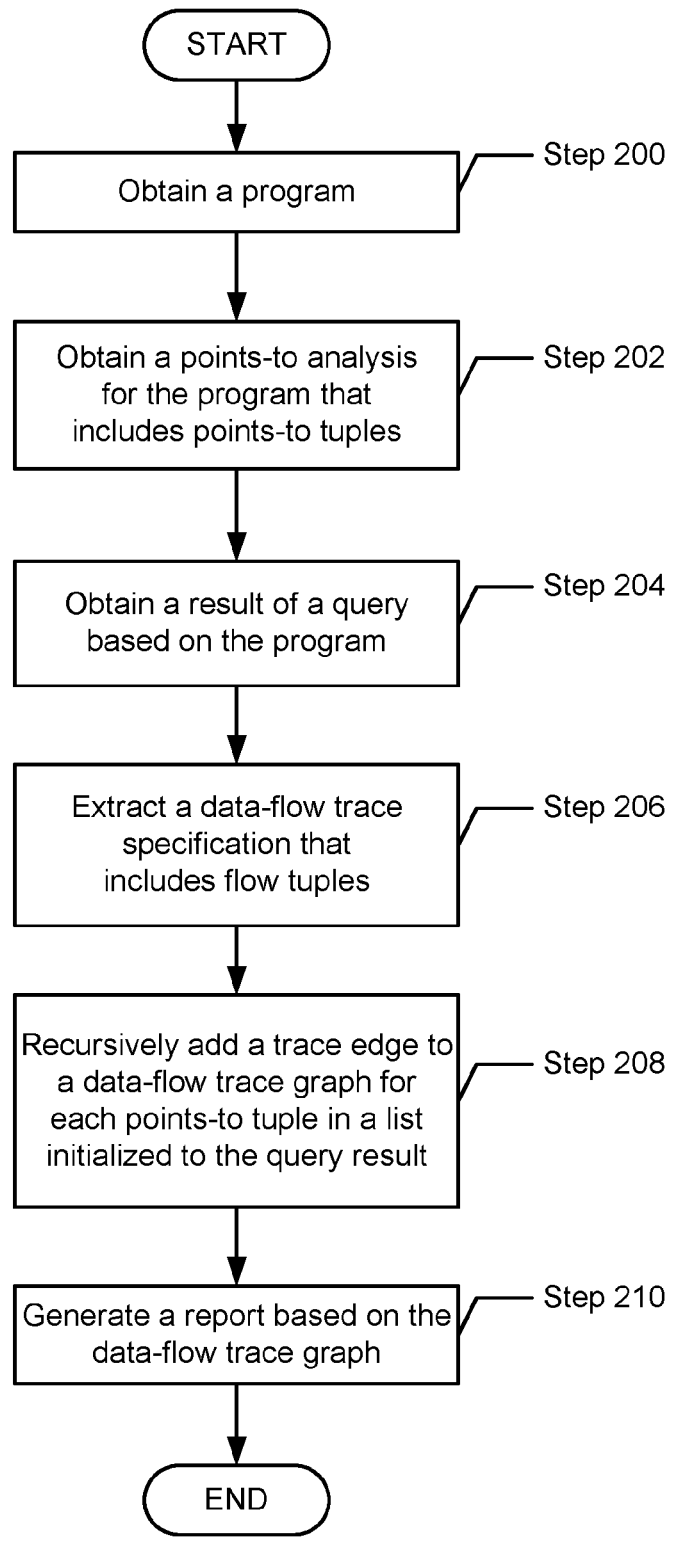
FIG. 2 and FIG. 3 show flowcharts in accordance with one or more embodiments of the invention.

FIG. 2 shows a flowchart in accordance with one or more embodiments of the invention. The flowchart depicts a process for analyzing a program. One or more of the steps in FIG. 2 may be performed by the components of the computer system (100), discussed above in reference to FIG. 1A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a program is obtained in accordance with one or more embodiments of the invention. For example, the program may be obtained from a repository. In Step 202, a points-to analysis for the program is obtained in accordance with one or more embodiments of the invention. For example, the points-to analysis may be obtained from a repository. In one or more embodiments, the points-to analysis may be a flow-insensitive (i.e., static) points-to analysis. The points-to analysis may include points-to tuples, where each points-to tuple may include a variable and an allocation site for an object, such that the variable may refer to the value at the allocation site during execution of the program.

In Step 204, a result of a query based on the program is obtained in accordance with one or more embodiments of the invention. The query may be obtained from a client (e.g., a developer) or may be obtained from a repository. In one or more embodiments, the query may be a condition relative to the program that may be satisfied by a subset of the points-to tuples on which to focus trace (i.e., provenance) generation (in Step 208 below) according to the interests of the user. A query may include one or more query variables that directly relate to the program conditions to be evaluated. For example, a query may be whether a particular method parameter may be supplied with a potentially tainted value.

In Step 206, a data-flow trace specification is extracted from the program in accordance with one or more embodiments of the invention. The data-flow trace specification may include information that may be used during the construction of the data-flow trace graph in Step 208 below. In one or more embodiments, the data-flow trace specification may include flow tuples, where each flow tuple may include a source variable defined in a first method and a sink variable defined in a second method. That is, the flow between the source variable and the sink variable may be an interprocedural flow where the sink variable may be assigned a value corresponding to the source variable during execution of the program. For example, the source variable may be an actual parameter of the first method, and the sink variable may be a formal parameter of the second method, where the second method is called by the first method. In one or more embodiments, both the first method and the second method may modify the heap (e.g., by allocating an object, modifying a field of an object, etc.). In one or more embodiments, intraprocedural flows corresponding to local assignments occurring between variables contained within a single method may be included in the analysis.

The data-flow trace specification may be generated by a syntactic traversal over the program source code to produce the flow tuples. For example, flow tuples may be generated based on statements in the program that cause interprocedural assignments (e.g., method invocations and returns) and statements corresponding to allocation sites.

In Step 208, a trace edge is recursively added to a data-flow trace graph for each points-to tuple of a list of points-to tuples. In one or more embodiments, the list of points-to tuples may be initialized to the result of the query. In one or more embodiments, the list of points-to tuples may be initialized to all, or a portion of the points-to tuples included in the points-to analysis obtained in Step 202. Each trace edge may include a source variable, a sink variable, and an allocation site. In one or more embodiments, the trace edge indicates that a value of the source variable may flow into the sink variable, where the value may correspond to the allocation site. In one or more embodiments, the respective points-to tuple is matched to a flow tuple of the data-flow trace specification based on a common source variable. That is, the variable of the respective points-to tuple may be the same as the source variable of the matching flow tuple. The flow tuple indicates the sink variable corresponding to the source variable, where the value of the source variable may flow into the sink variable.

In one or more embodiments, the source variable of the trace edge may be obtained from the respective points-to tuple, the sink variable of the trace edge may be obtained from the corresponding flow tuple, and the allocation site of the trace edge may be obtained from the respective points-to tuple. In one or more embodiments, there may be multiple flow tuples corresponding to the source variable, indicating multiple possible sink variables that the value of the source variable may flow into. In one or more embodiments, a trace edge may be created for some or all of the multiple possible sink variables that correspond to the source variable. In one or more embodiments, the sink variable and the allocation site are used to form a new points-to tuple that is added to the list of points-to tuples, to enable the trace to be continued from the sink variable (e.g., the sink variable may become a source variable for processing in a subsequent iteration of Step 208). Once the respective points-to tuple has been fully processed, it may be removed from the list of points-to tuples.

In Step 210, a report is generated from the data-flow trace graph. The report may be generated by a syntactic traversal over the data-flow trace graph. For example, the report may include, for each variable and/or each allocation site in the data-flow trace graph, a listing of the edges corresponding to the variable. The report generated from the data-flow trace graph may help a user to understand, verify and/or debug potential program defects involving variables and/or allocation sites identified in program analyses (e.g., security analyses).

Figure 3:
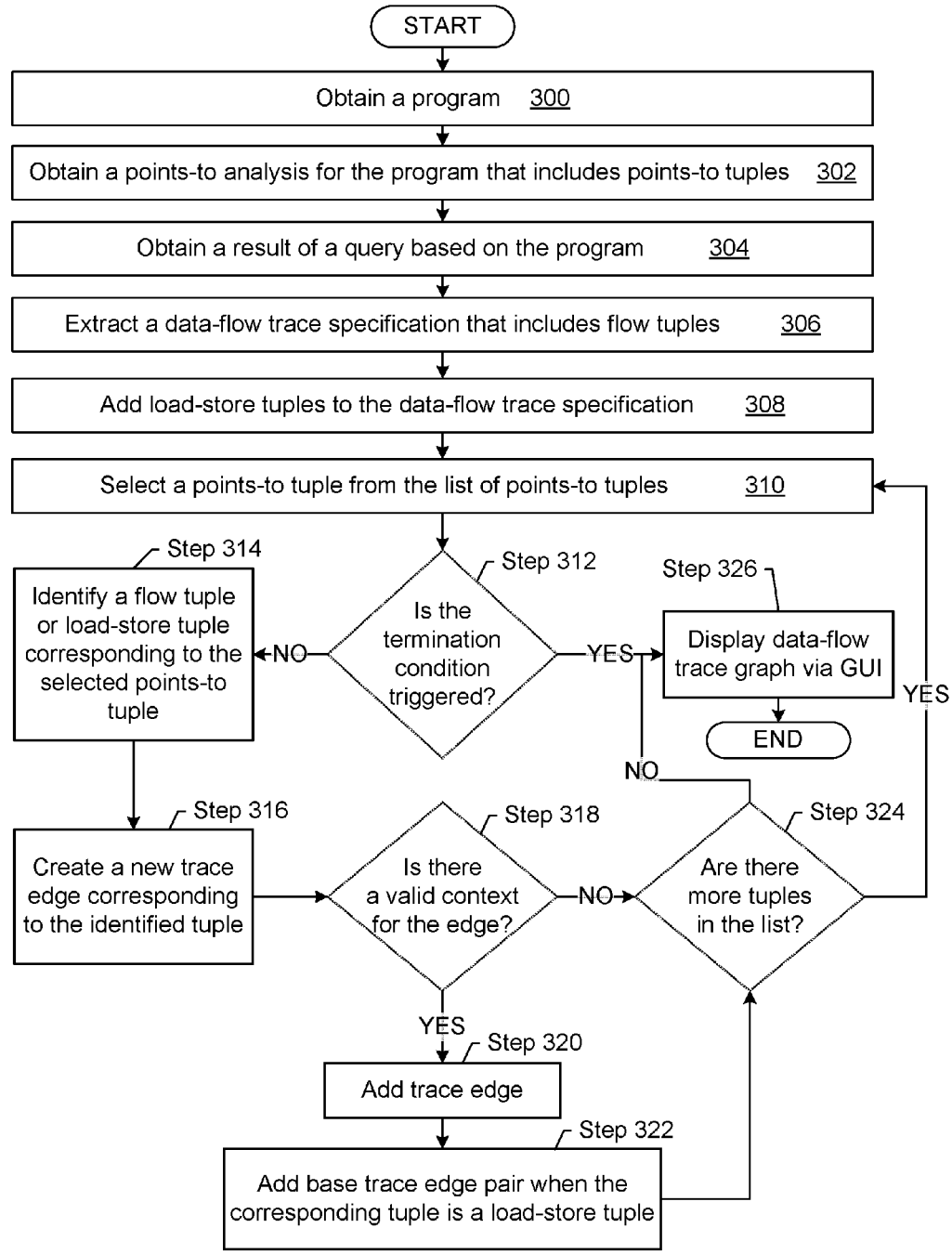

FIG. 3 shows a flowchart in accordance with one or more embodiments of the invention. The flowchart depicts a process, in more detail than FIG. 2, for analyzing a program. One or more of the steps in FIG. 3 may be performed by the components of the computer system (100), discussed above in reference to FIG. 1A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, a program is obtained, as previously described in Step 200. In Step 302, a points-to analysis for the program is obtained, as previously described in Step 202.

In Step 304, a result of a query based on the program is obtained, as previously described in Step 204. In Step 306, a data-flow trace specification is extracted from the program, as previously described in Step 206.

In Step 308, load-store tuples are added to the data-flow trace specification. In one or more embodiments, each load-store tuple may include a storing variable, a loading variable, a source base variable, a sink base variable, and a field. A load-store tuple may represent the flow of a value that may be stored to and loaded from of a field of a base object that is aliased by two base variables: a source base variable and a sink base variable. The source base variable may be used when the value is stored, via the storing variable, to the field of the base object, and the sink base variable may be used when the value is loaded, via the loading variable, from the field of the base object.

In one or more embodiments, alias tuples may be added to the data-flow trace specification. Each alias tuple may represent the alias relationship between the source base variable and the sink base variable relative to a common base object. That is, each alias tuple may include a source base variable, a sink base variable, and a common base object that is aliased (e.g., via an assignment) by both the source base variable and the sink base variable.

In one or more embodiments, load-store tuples and alias tuples may be generated by a syntactic traversal over the program source code. For example, load-store tuples may be generated by analyzing statements that store a value to or a load a value from a field of an object. Similarly, alias tuples may be generated by analyzing statements (e.g., including method invocations and returns) that assign a value of one base variable to another base variable.

In Step 310, a points-to tuple is selected from a list of points-to tuples. In one or more embodiments, the list of points-to tuples may be initialized to the result of the query. In one or more embodiments, the list of points-to tuples may be initialized to all, or a portion of the points-to tuples of the points-to analysis obtained in Step 302. In particular, a points-to tuple from the list of points-to tuples may be selected automatically by a computing system. If selected by the computing system, a software application may select the points-to tuple using a software algorithm, e.g., a pseudo-random algorithm or in an iterative manner. On the other hand, if selected by a user, the user may designate the points-to tuple from the list of points-to tuples. Thus, a software program may obtain a selection of the points-to tuple from the user, e.g., via a graphical user interface.

In Step 312, it is determined whether the termination condition has been triggered, indicating that the analysis is complete. In one or more embodiments, the termination condition may be triggered when the selected points-to tuple includes a variable that is a parameter of a public method. For example, reaching a parameter of a public application programming interface (API) method may be a termination condition for a program performing a security analysis aimed at tracing the impact of potentially tainted data. Alternatively, reaching a return variable of a public API method, or reaching a publicly accessible field of a publicly accessible object may be a termination condition for a program performing an escape analysis. If a termination condition has been triggered, then Step 326 below is performed. Otherwise, Step 314 below is performed.

In Step 314, a flow tuple or a load-store tuple corresponding to the selected points-to tuple is identified. For example, the variable of the selected points-to tuple may correspond to a source variable of a flow tuple. Alternatively, for example, the variable of the selected points-to tuple may correspond to a storing variable of a load-store tuple. In one or more embodiments, multiple flow tuples and/or load-store tuples that correspond to the selected points-to tuple may be identified.

In Step 316, a new trace edge is created corresponding to the tuple identified above in Step 314 (see also Step 208 above). In one or more embodiments, when the identified tuple is a flow tuple, the source variable of the new trace edge may be the variable of the selected points-to tuple, the sink variable of the new trace edge may be the sink variable of the flow tuple, and the allocation site of the new trace edge may be the allocation site of the selected points-to tuple.

In one or more embodiments, when the identified tuple is a load-store tuple, the source variable of the new trace edge may be the variable of the selected points-to tuple, the sink variable of the new trace edge may be the loading variable of the flow tuple, and the allocation site of the new trace edge may be the allocation site of the selected points-to tuple. There may be multiple sink variables that the source variable may 'flow into' (i.e., may be assigned to), which may be indicated when multiple flow tuples include the source variable.

In one or more embodiments, new trace edges may be created corresponding to multiple flow tuples and/or load-store tuples that correspond to the selected points-to tuple.

In Step 318, it is determined whether the new trace edge created above in Step 316 has a valid context. By determining contexts at the calling site, the called site and/or the allocation site, it may be possible to increase the precision of the analysis by reducing the number of 'false positive' edges added to the data-flow trace graph. That is, such false positive edges may represent infeasible execution paths due to the lack of appropriate contexts in which to bind the variables associated with the trace edge. For example, if the source variable and the sink variable of a new trace edge do not refer to the allocation site of the new trace edge in the same context, then the new trace edge may be considered a false positive edge that represents an execution flow that cannot occur in practice. In one or more embodiments, contexts may be determined for the source variable, sink variable and allocation site of the new trace edge. If a suitable context cannot be identified for the new trace edge, then the new trace edge may be excluded from the data-flow trace graph. In one or more embodiments, a user-configurable parameter determines whether contexts may be checked before adding a new trace edge to the data-flow trace graph.

For example, a feasible execution flow may analyze contexts for the calling method and the called method that link the actual parameter (e.g., source variable) at the invocation in the calling method to the formal parameter (e.g., sink variable) of the called method, where the source variable and the sink variable may point-to the same allocation site (i.e., heap object) in a common context. The following illustrates how contexts may be dynamically determined relative to trace edges that are based on flow tuples. Analogous rules may be formulated for determining the contexts of base trace edges that are based on load-store tuples and alias tuples.

In one or more embodiments, the context for a trace edge may include an extended points-to tuple that includes a source context $ctxt_{source}$ for the source variable $var_{source}$ of the new trace edge and an allocation context $ctxt_{alloc}$ for the allocation site obj of the new trace edge. An extended points-to tuple for the source variable may be written as:
VarPointsToObj($ctxt_{source}$, $var_{source}$, obj, $ctxt_{alloc}$)

Similarly, an extended points-to tuple for the sink variable may be written as:
VarPointsToObj($ctxt_{sink}$, $var_{sink}$, obj, $ctxt_{alloc}$)

In one or more embodiments, the context for the trace edge may further include a call graph tuple that includes the source context $ctxt_{source}$, the sink context $ctxt_{sink}$, and an invocation i of a method m:
CallGraphEdge($ctxt_{source}$, i, $ctxt_{sink}$, m)

In one or more embodiments, the context for the trace edge may further include an actual parameter tuple that includes the source variable $var_{source}$, the invocation i and the index of the parameter within the invocation:
ActualParameter(index, i, $var_{source}$)

In one or more embodiments, the context may further include a formal parameter tuple that includes the sink variable $var_{sink}$, the invoked method m and the index (i.e., position) of the parameter within the method:
FormalParameter(index, m, $var_{sink}$)

In one or more embodiments, contexts may be added to the trace edges and/or base trace edges themselves (e.g., where variables and allocation sites may be prefixed with contexts). This may increase the precision of the analysis, at the cost of increasing the number of edges in the data-flow graph.

If the new trace edge has a valid context, then the new trace edge is added to the data-flow trace graph (in Step 320). Otherwise, the new trace edge is discarded, and Step 324 is performed to check if the loop starting at Step 310 above can be continued by selecting another points-to tuple from the list of points-to tuples. If multiple new trace edges have been identified, then those new trace edges with valid contexts may be added to the data-flow trace graph (in Step 320). In one or more embodiments, the sink variable and the allocation site are used to form a new points-to tuple that is added to the list of points-to tuples, to enable the trace to be continued from the sink variable (e.g., the sink variable becomes a source variable for processing in a subsequent iteration of the loop starting at Step 310). The selected points-to tuple may be removed from the list of points-to tuples, once the selected points-to tuple has been fully processed.

In Step 322, a new base trace edge pair is added to the data-flow trace graph when the tuple identified in Step 316 is a load-store tuple. In one or more embodiments, a new storing base trace edge may be added corresponding to the store operation indicated by the load-store tuple and a new loading base trace edge may be added corresponding to the load operation indicated by the load-store tuple. Each storing base trace edge may include a storing variable, a source base variable, and a field. In one or more embodiments, the storing base trace edge may indicate that a value of the storing variable may flow into the field of the base object referenced by the source base variable. Each loading base trace edge may include a loading variable, a sink base variable, and a field. In one or more embodiments, the loading base trace edge may indicate that a value may flow from the field of the base object referenced by the sink base variable to the loading variable. For example, see the non-limiting examples of a storing base trace edge (530) and a loading base trace edge (532) in FIG. 5.

In one or more embodiments, the base trace edge pair may correspond to an alias tuple that indicates the aliasing of the source base variable and the sink base variable with the base object.

In one or more embodiments, the source base variable and the base object may be used to form a new points-to tuple to be added to the list of points-to tuples to trace the flow relative to the source base variable (e.g., in a subsequent iteration of the loop starting at Step 310). Similarly, the sink base variable and the base object may be used to form another new points-to tuple to be added to the list of points-to tuples to trace the flow relative to the sink base variable. The selected points-to tuple may be removed from the list of points-to tuples, once the selected points-to tuple has been fully processed.

In Step 324, it is determined whether there are additional points-to tuples in the list of points-to tuples. If so, then the loop beginning in Step 310 above is again performed, where another points-to tuple may be selected from the list of points-to tuples. Otherwise, Step 326 below is performed.

In Step 326, the data-flow trace graph is displayed to a user via a graphical user interface (GUI). In one or more embodiments, in order to simplify and focus the presentation of the data-flow trace graph, the GUI may provide an option to display a shortest path between variables shown in the data-flow trace graph. In one or more embodiments, the GUI may provide an option to display one or more acyclic paths in the data-flow trace graph. In one or more embodiments, the GUI may provide an option to display those edges in the data-flow trace graph satisfying a predetermined criterion or a criterion defined by a user.

Figure 5:
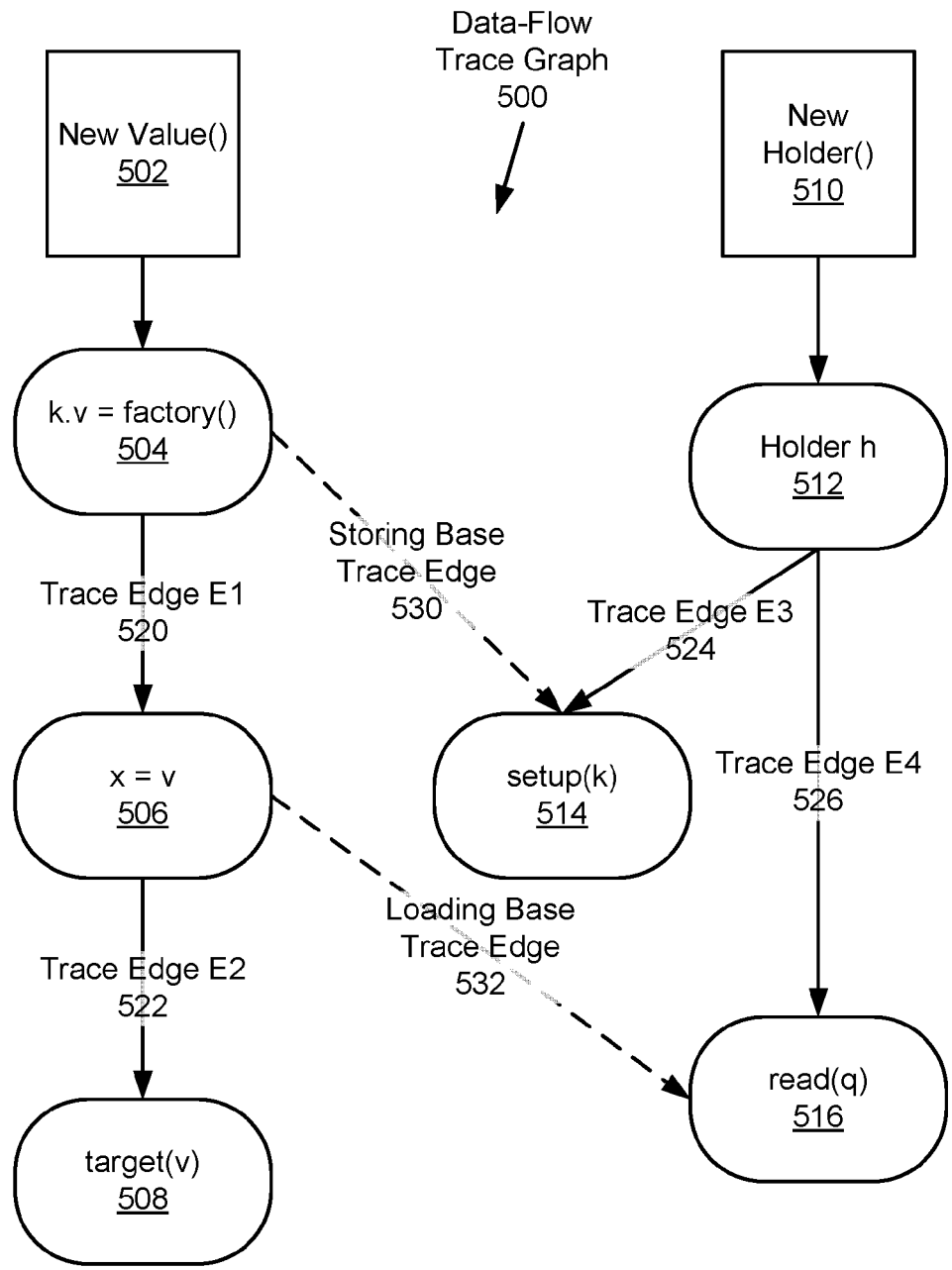

The following example is for explanatory purposes only and not intended to limit the scope of the invention. FIG. 4 and FIG. 5 illustrate an example in accordance with one or more embodiments of the invention.

FIG. 4 shows a small program (400), whose corresponding data-flow trace graph (500) is shown in FIG. 5. In FIG. 4, the class Example (402) defines a subclass Value (404) which has a corresponding allocation site (416) in the factory method. The query relates to the points-to tuple VarPointsToObj(v, value), where v is the parameter v of the method target (426) and value is the allocation site (416) that creates an object of type Value. The data-flow trace graph (500) shows the provenance for the points-to tuple VarPointsToObj(v, value).

There are two flows associated with the program (400) and its corresponding data-flow trace graph (500): a 'field flow' relating to a value that is stored to and loaded from a field, and a 'base object flow' relating to the aliasing of a base object that contains the field.

The field flow may be represented by the following flow tuples (e.g., in a data-flow trace specification extracted from the program (400)):
- Flow(k.v, x): from source field k.v (418) to sink variable x (422) in the read method (420), shown by trace edge E1 (520)
- Flow(x, v): from source variable x (424) into sink variable v in the target method (426), shown by trace edge E2 (522)

The base object flow may be represented by the following flow tuples:
- Flow(h, k): from source base variable h (412) to sink base variable k in the setup method (418), shown by trace edge E3 (524)
- Flow(h, q): from source base variable h (414) into sink base variable q in the read method (420), shown by trace edge E4 (526)

Trace edges (520, 522, 524, 526) in the data-flow trace graph (500) may correspond to interprocedural assignments between a source variable and a sink variable due to a method invocation, relative to an allocation site. For example, trace edge E2 (522) may be represented as TraceEdge(x, v, value), where value represents the allocation site (416) for the new Value. Similarly, trace edge E3 (524) may be represented as TraceEdge(h, k, holder), where holder represents the allocation site (410) for the new base object Holder (406).

The field flow begins with an allocation site (416) in the factory method (416) that creates a new object of the class Value (404). The allocation site (416) for the new Value in the program (400) corresponds to the allocation site (502) for the new Value in the factory method. The base object flow begins with a base object allocation site (410) in the entryPoint method (408) for the Holder class (406). The base object allocation site (410) for the new Holder base object in the program (400) corresponds to the base object allocation site (510) for the new Holder base object in the data-flow trace graph (500). Allocation sites (502, 510) are shown as rectangles in the data-flow trace graph (500) and variables (504, 506, 508, 512, 514, 516) are shown as ovals.

The field flow begins with the allocation site (502), associated with the field v (504), which corresponds to the store operation k.v=factory( ) in the method setup (418). The allocation site (502) flows into loading variable x (506) which corresponds to the load operation x=forward(q.v) (422). However, because the forward method (428) is a parameter-forwarding (i.e., non-value-added) method, its role in the trace is ignored, and the load operation (422) is re-written as simply x=v (506). The flow from field v (504) to variable x (506) is shown by trace edge E1 (520). The allocation site (502) then flows into parameter v (508) in the target method (426). The flow from variable x (506) to variable v (508) is shown by trace edge E2 (522). Since v is the query variable, there is no need to construct any additional provenance.

The base object flow begins with the base object allocation site (510), which is assigned to the base object variable h (512) in the entryPoint method (408). The base object allocation site (510) flows into source base variable k (514) which is used to store a value into the base object referenced by source base variable k (514). Source base variable k (514) is a formal parameter of the setup method (418) that is bound to an actual parameter h at the invocation of setup (412) in the entryPoint method (408). The flow from the base object variable h (512) to source base variable k (514) is shown by trace edge E3 (524), which occurs via an interprocedural assignment when setup (412) is invoked in the entryPoint method (408). The base object allocation site (510) also flows into sink base variable q (516) which is used to load a value from the base object referenced (i.e., aliased) by sink base variable q (516). Sink base variable q (516) is a formal parameter of the read method (420) that is bound to an actual parameter h at the invocation of read (414) in the entryPoint method (408). The flow from base object variable h (512) to sink base variable k (516) is shown by trace edge E4 (526), which occurs via an interprocedural assignment when read (414) is invoked in the entryPoint method (408).

The field flow and the base object flow are linked via a base trace edge pair consisting of a storing base trace edge (530) and a loading base trace edge (532). The storing base trace edge (530) corresponds to a store operation where a value (504) is stored into a field of the base object aliased by source base variable k (514). The loading base trace edge (532) corresponds to a load operation where a value is loaded into a loading variable x (506) from a field of the base object aliased by sink base variable q (516).

The base trace edge pair corresponds to a load-store tuple LoadStore(k.v, x, k, q, v) that represents the store operation into the field of a base object and the load operation from that field. The storing field is k.v in the setup method (418), the loading variable is local variable x (422) of the read method, the source base variable is parameter k (418) of the setup method, the sink base variable is parameter q (420) of the read method, and the field is v that is stored into by the setup method (418) and loaded from in the read method (420).

Figure 6A:
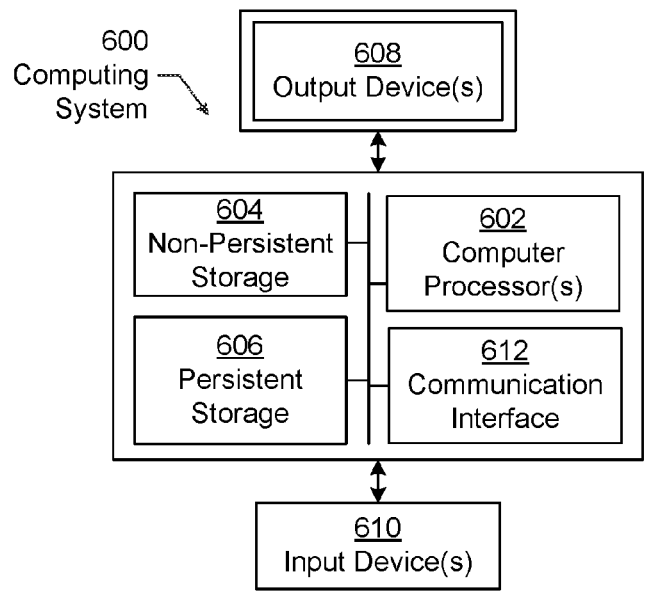
FIG. 6A and FIG. 6B show computing systems in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
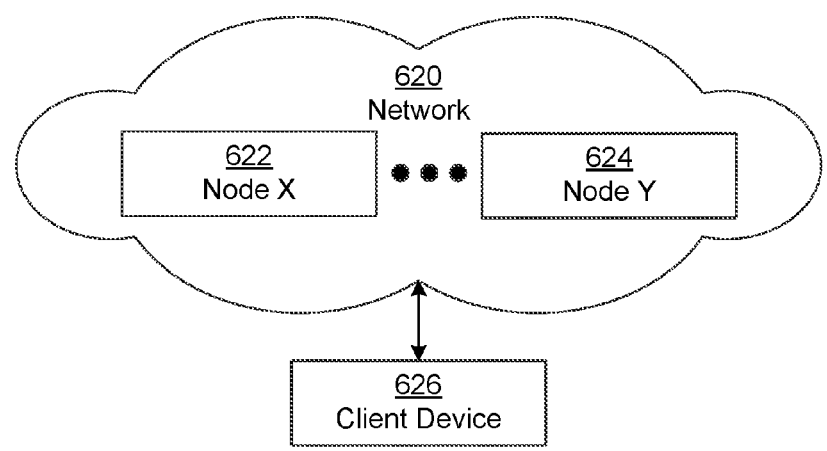

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a program, comprising:
   obtaining the program;
   obtaining a query for a points-to analysis for the program;
   obtaining the points-to analysis for the program, the points-to analysis comprising a plurality of points-to tuples, each points-to tuple comprising a variable and an allocation site for an object;
   obtaining a result of the query, the result comprising a subset of the plurality of points-to tuples;
   extracting, from the program, by a data-flow trace engine, a data-flow trace specification comprising a plurality of flow tuples, each flow tuple comprising a source variable defined in a first method and a sink variable defined in a second method, wherein the sink variable is assigned a value of the source variable during execution of the program;
   generating, by the data-flow engine and using the data-flow trace specification, a data-flow trace graph;
   adding, by the data-flow trace engine, in a recursive manner until a termination condition is triggered, a trace edge to the data-flow trace graph for each points-to tuple of a list of points-to tuples, wherein the list of points-to tuples is initialized to the result of the query, wherein the respective points-to tuple corresponds to a first flow tuple of the plurality of flow tuples, and wherein the respective points-to tuple and the first flow tuple are used to form a first points-to tuple that is added to the list of points-to tuples; and generating, by the data-flow trace engine, a report about the result of the query based on the data-flow trace graph.

2. The method of claim 1, wherein the data-flow trace specification further comprises a plurality of load-store tuples, each load-store tuple comprising a loading variable, a storing variable, a source base variable, a sink base variable, and a field of a base object, wherein the storing variable is used to store a value to the field via the source base variable, and wherein the loading variable is used to load a value from the field via the sink base variable, wherein the method further comprises:

adding a base trace edge pair to the data-flow trace graph for each points-to tuple of the list of points-to tuples that corresponds to a load-store tuple of the plurality of load-store tuples.

3. The method of claim 1, further comprising:

determining whether there is a valid context associated with the trace edge, wherein adding the trace edge to the data-flow trace graph depends on the determination.

4. The method of claim 1, wherein the first method performs an operation that modifies a value of an allocation site and the second method performs an operation that modifies a value of an allocation site.

5. The method of claim 1, further comprising:

displaying the data-flow trace graph via a graphical user interface (GUI) comprising a first option to display a shortest path between a first variable of the data flow trace graph and a second variable of the data flow trace graph, and a second option to display a plurality of edges in the data flow trace graph satisfying a predetermined criterion.

6. The method of claim 1, wherein the termination condition is triggered when the respective points-to tuple corresponds to a parameter of a public application programming interface (API) method of the program.

7. A system for analyzing a program, comprising:

a processor;

a memory comprising instructions that, when executed by the processor, cause the processor to:

obtain the program;

obtain a query for a points-to analysis for the program;

obtain the points-to analysis for the program, the points-to analysis comprising a plurality of points-to tuples, each points-to tuple comprising a variable and an allocation site for an object;

obtain a result of the query, the result comprising a subset of the plurality of points-to tuples;

extract, from the program, by a data-flow trace engine, a data-flow trace specification comprising a plurality of flow tuples, each flow tuple comprising a source variable defined in a first method and a sink variable defined in a second method, wherein the sink variable is assigned a value of the source variable during execution of the program;

generate, by the data-flow engine and using the data-flow trace specification, a data-flow trace graph;

add, by the data-flow trace engine, in a recursive manner until a termination condition is triggered, a trace edge to the data-flow trace graph for each points-to tuple of a list of points-to tuples, wherein the list of points-to tuples is initialized to the result of the query, wherein the respective points-to tuple corresponds to a first flow tuple of the plurality of flow tuples, and wherein the respective points-to tuple and the first flow tuple are used to form a first points-to tuple that is added to the list of points-to tuples; and generate, by the data-flow trace engine, a report about the result of the query based on the data-flow trace graph; and a repository, configured to store at least the program, the query and the plurality of points-to tuples.

8. The system of claim 7, wherein the data-flow trace specification further comprises a plurality of load-store tuples, each load-store tuple comprising a loading variable, a storing variable, a source base variable, a sink base variable, and a field of a base object, wherein the storing variable is used to store a value to the field via the source base variable, and wherein the loading variable is used to load a value from the field via the sink base variable, and wherein the memory further comprises instructions that, when executed by the processor, cause the processor to add a base trace edge pair to the data-flow trace graph for each points-to tuple of the list of points-to tuples that corresponds to a load-store tuple of the plurality of load-store tuples.

9. The system of claim 7, wherein the memory further comprises instructions that, when executed by the processor, cause the processor to:

determine whether there is a valid context associated with the trace edge, wherein adding the trace edge to the data-flow trace graph depends on the determination.

10. The system of claim 7, wherein the first method performs an operation that modifies a value of an allocation site and the second method performs an operation that modifies a value of an allocation site.

11. The system of claim 7, wherein the memory further comprises instructions that, when executed by the processor, cause the processor to:

display the data-flow trace graph via a graphical user interface (GUI comprising a first option to display a shortest path between a first variable of the data flow trace graph and a second variable of the data flow trace graph, and a second option to display a plurality of edges in the data flow trace graph satisfying a predetermined criterion.

12. The system of claim 7, wherein the termination condition is triggered when the respective points-to tuple corresponds to a parameter of a public application programming interface (API) method of the program.

13. A non-transitory computer readable medium comprising instructions that, when executed by a processor, perform a method for analyzing a program, the method comprising:

obtaining the program;

obtaining a query for a points-to analysis for the program;

obtaining the points-to analysis for the program, the points-to analysis comprising a plurality of points-to tuples, each points-to tuple comprising a variable and an allocation site for an object;

obtaining a result of the query, the result comprising a subset of the plurality of points-to tuples;

extracting, from the program, by a data-flow trace engine, a data-flow trace specification comprising a plurality of flow tuples, each flow tuple comprising a source variable defined in a first method and a sink variable defined in a second method, wherein the sink variable is assigned a value of the source variable during execution of the program;

generating, by the data-flow engine and using the data-flow trace specification, a data-flow trace graph;

adding, by the data-flow trace engine, in a recursive manner until a termination condition is triggered, a trace edge to the data-flow trace graph for each points-to tuple of a list of points-to tuples, wherein the list of points-to tuples is initialized to the result of the query, wherein the respective points-to tuple corresponds to a first flow tuple of the plurality of flow tuples, and wherein the respective points-to tuple and the first flow tuple are used to form a first points-to tuple that is added to the list of points-to tuples; and generating, by the data-flow trace engine, a report about the result of the query based on the data-flow trace graph.

14. The non-transitory computer readable medium of claim 13, wherein the data-flow trace specification further comprises a plurality of load-store tuples, each load-store tuple comprising a loading variable, a storing variable, a source base variable, a sink base variable, and a field of a base object, wherein the storing variable is used to store a value to the field via the source base variable, and wherein the loading variable is used to load a value from the field via the sink base variable, and wherein the method further comprises adding a base trace edge pair to the data-flow trace graph for each points-to tuple of the list of points-to tuples that corresponds to a load-store tuple of the plurality of load-store tuples.

15. The non-transitory computer readable medium of claim 13, wherein the method further comprises:
    determining whether there is a valid context associated with the trace edge, wherein adding the trace edge to the data-flow trace graph depends on the determination.

16. The non-transitory computer readable medium of claim 13, wherein the first method performs an operation that modifies a value of an allocation site and the second method performs an operation that modifies a value of an allocation site.

17. The non-transitory computer readable medium of claim 13, wherein the method further comprises:
    displaying the data-flow trace graph via a graphical user interface (GUI) comprising a first option to display a shortest path between a first variable of the data flow trace graph and a second variable of the data flow trace graph, and a second option to display a plurality of edges in the data flow trace graph satisfying a predetermined criterion.

18. The non-transitory computer readable medium of claim 13, wherein the termination condition is triggered when the respective points-to tuple corresponds to a parameter of a public application programming interface (API) method of the program.

* * * * *

UNITED STATES PATENT AND TRADEMARK OFFICE
CERTIFICATE OF CORRECTION

PATENT NO. : 9,811,322 B1
APPLICATION NO. : 15/169710
DATED : November 7, 2017
INVENTOR(S) : Sindelar et al.

Page 1 of 1

It is certified that error appears in the above-identified patent and that said Letters Patent is hereby corrected as shown below:

On page 2, Column 1, under Other Publications, Line 3, delete "Simplied,"" and insert -- Simplified," --, therefor.

On page 2, Column 2, under Other Publications, Line 25, delete "Seatle," and insert -- Seattle, --, therefor.

On page 2, Column 2, under Other Publications, Line 30, delete "Imprementing" and insert -- Implementing --, therefor.

In Column 7, Lines 12-13, delete "B aseTraceEdgePair" and insert -- BaseTraceEdgePair --, therefor.

In Column 7, Line 13, delete "SourceB aseVar," and insert -- SourceBaseVar, --, therefor.

In Column 7, Line 14, delete "SinkB aseVar," and insert -- SinkBaseVar, --, therefor.

In Column 18, Line 36, in Claim 11, delete "(GUI" and insert -- (GUI) --, therefor.

Signed and Sealed this
Twenty-sixth Day of June, 2018

Andrei Iancu
*Director of the United States Patent and Trademark Office*